(12) United States Patent
Lai et al.

(10) Patent No.: US 9,315,623 B1
(45) Date of Patent: *Apr. 19, 2016

(54) SOLUTION PROCESSABLE PERYLENE COPOLYMER

(71) Applicant: The United States of America as Represented by the Secretary of the Navy, Washington, DC (US)

(72) Inventors: William C. Lai, Ridgecrest, CA (US); Alfred Baca, Ridgecrest, CA (US); Benjamin Harvey, Ridgecrest, CA (US); M. Joseph Roberts, Ridgecrest, CA (US); Heather Meylemans, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/971,104

(22) Filed: Aug. 20, 2013

Related U.S. Application Data

(60) Provisional application No. 61/692,633, filed on Aug. 23, 2012.

(51) Int. Cl.
*C08G 65/38* (2006.01)
*C08G 65/00* (2006.01)

(52) U.S. Cl.
CPC .................................... *C08G 65/38* (2013.01)

(58) Field of Classification Search
CPC .................................................... C08G 65/38
USPC .......... 525/534; 528/205, 219, 211, 173, 168; 524/611, 609; 428/141
See application file for complete search history.

(56) References Cited

PUBLICATIONS

Li et al; Photonic logic gates—perylene Bisimide; Journal of organic Chemistry (2007), 72(8), 2878-2885; Chem Abstract 146: 490085.*
U.S. Appl. No. 13/895,885, Lai, et al.
U.S. Appl. No. 14/023,219, Lai, et al.
U.S. Appl. No. 14/172,701, Harvey, et al.
U.S. Appl. No. 14/172,673, Harvey, et al.
U.S. Appl. No. 13/667,188, Roberts, et al.
U.S. Appl. No. 13/658,573, Roberts, et al.
U.S. Appl. No. 13/667,205, Roberts, et al.
Shin, et al. Omnidirectional resonance in a metal dielectric metal geometry, Applications Physics Letters, vol. 84, No. 2231, May 2004, pp. 4421-4423.
Schneider, et al. "An Ultraviolet Organic Thin-Film Solid-State Laser for Biomarker Applications", Advanced Materials, vol. 17, No. 1, Jan. 6, 2005, pp. 31-34.
Baier, et al. Fluoroscent conjugated polymer nanoparticles by polymerization in miniemulsion, J. Am. Chem. Soc. 2009, vol. 131, pp. 14267-14273.

* cited by examiner

*Primary Examiner* — Duc Truong
(74) *Attorney, Agent, or Firm* — Charlene A. Haley

(57) ABSTRACT

A soluble n-type copolymer that is useful in electronic and photonic devices. Embodiments of the invention include an n-type copolymer having a soluble n-type perylene copolymer having base formula A, where R is a backbone segment, where $R_1$ and $R_2$ are independently selected from the group consisting of alkyl, fluorinated alkyl, functionalized alkyl, aryl, fluorinated aryl, and functionalized aryl, and where n ranges from about 2 to 50,000.

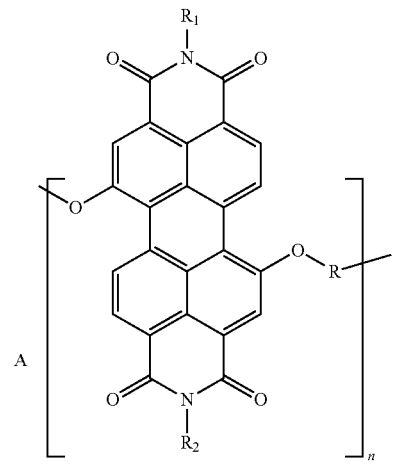

24 Claims, No Drawings

SOLUTION PROCESSABLE PERYLENE COPOLYMER

CROSS-REFERENCE TO RELATED APPLICATIONS

This is a non-provisional patent application, claiming the benefit of, parent application Ser. No. 61/692,633 filed on Aug. 23, 2012, and is a continuation-in-part patent application, claiming the benefit of parent applications Ser. No. 13/667,188 filed on Nov. 2, 2013, and Ser. No. 13/658,573 filed on Oct. 23, 2013 which claims benefit of provisional patent application Ser. No. 61/624,811 filed on Apr. 16, 2012, and Ser. No. 13/667,206 filed on Nov. 2, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to soluble n-type copolymers and making the same that are useful in electronic and photonic devices.

DETAILED DESCRIPTION OF THE EMBODIMENTS OF THE INVENTION

Embodiments of the invention generally relate to soluble n-type copolymers of perylene diimides and making the same that are useful in electronic and photonic devices.

Organic polymers that have π-electron conjugated dyes, groups, units, and backbone segments (including the perylene unit) are useful in electronic and photonic devices because their π-electrons (and holes) are relatively mobile (as in semiconductors), and they are often lumenescent. These polymers can be 'doped' with a redox additive or by electrodes that donate or withdraw electric charge to and/or from the polymer which can increase charge mobility, fine-tune the optical or electrical bandgap, and increase the stability of the copolymer.

An auxiliary group attached to the π-conjugated units in the copolymer can donate or withdraw electric charge to and/or from the copolymer. Auxiliary groups may also impart changes in charge mobility, size of the bandgap and stability. An electron-withdrawing group on a conjugated backbone segment, dye, or unit would make the copolymer an 'n-type' copolymer, whereas an electron donating group would make the copolymer a 'p-type' copolymer.

Aromatic polymers and copolymers having the perylene unit, here-to-fore, have been shown to have limited solubility in safe and common solvents, and therefore they are very difficult and expensive to fabricate into films. Furthermore, strong exotic solvents can be very corrosive to any substrate touching the copolymer. Moreover, here-to-fore, films made from perylene-containing copolymer systems have rough surfaces and exhibit surface peaks and valleys more than several nanometers in height and depth precluding their use in many applications, such as plasmonic devices.

An embodiment of the invention is a family of n-type soluble perylene copolymers resulting, for example, from the nucleophilic aromatic substitution reaction between a dibromoperylene diimide and a difunctional nucleophile. These copolymers possess the desirable properties of perylene, including photo stability and thermal stability, while at the same time are processable using common organic solvents such as tetrahydrofuran (THF) and chloroform. Furthermore, these copolymers form extremely flat films having surface peak-to-valley roughness less than one nanometer over a surface area of 0.5×0.5 microns, for example, when spin-cast on a conventional glass microscope slide. In this case, the copolymer could also be considered a planarizing film.

Having flexibility in the choice of processing solvents is sometimes advantageous. For example, certain processing techniques used to form bulk hetero-junctions, work well when co-casting the donor and acceptor copolymers/materials using a common solvent. This would be especially true when pairing the perylene copolymer with a specific complementary p-type polymer (or copolymer).

A general chemical structure of soluble n-type perylene copolymers of the invention is shown in (base formula A).

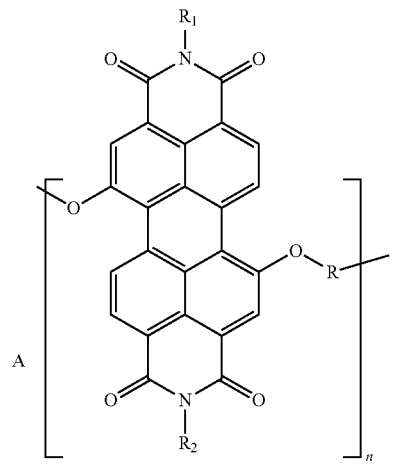

In base formula A, R is a backbone segment, such as alkylene, arylene and other organic units, as well as hybrid organic-inorganic and organometallic units. Copolymers of the embodiments, of the invention may result from nucleophilic aromatic substitution reactions between, for example, dibromoperylene dialkyl diimide and difunctional nucleophiles. Examples of difunctional nucleophiles are dihydroxyl comonomers (namely, HO—R—OH). Examples of copolymers in which dihydroxyl comonomers are bisphenols are given below. The subscript 'n' signifies the number of repeat units along the copolymer backbone, and may range from about 5 to over 50,000 and may range from 2 to 5 units (called oligomers) to as many as 50,000 units (called high polymers) depending on their use. Also any combination number ranges within 2-50,000 are possible embodiments.

Examples of $R_1$ and $R_2$ (base formula A) are alkyl, 2-ethylhexyl, 4-carbon to 24-carbon alkyl, 6-carbon to 30-carbon, cycloalkyl, functionalized alkyl, aryl, functionalized aryl, fluorinated groups, and perfluorinated groups.

A general structure of bisphenol comonomers embodied in the invention is shown below. Although a para-substituted structure is shown below, it is to be understood that the substitution patterns on each ring can also independently be ortho and meta.

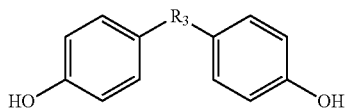

Above is a chemical structure of bisphenol comonomers of the embodiments in the invention. $R_3$ can be, for example, methylene, ethylene, propylene, isopropylene, trimethylcyclohexylene, hexafluoroisopropylene, ether, amine, carbazole, sulfide, sulfone, phosphine, phosphine oxide, and phosphinate. The use of other bisphenol comonomers, including 4,4'-dihydroxy biphenylene and similar dihydroxy triphenylenes, is an embodiment of the invention.

To make the soluble perylene copolymers, the use of bio-derived bisphenol comonomers, shown below, which have flexible solubilizing groups that aide in solubilizing the resulting perylene copolymers and that aide in forming planarizing films of these copolymers, are embodiments of the invention. The use of other commercially available bio-derived bisphenols are embodiments of the invention.

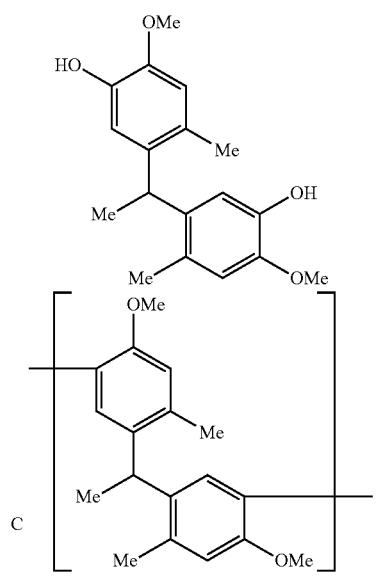

Left side is a bio-derived bisphenol; right side is a structure C, which is an example of an R segment in base formula A resulting from the condensation copolymerization of the bisphenol comonomer on the left side with a perylene comonomer.

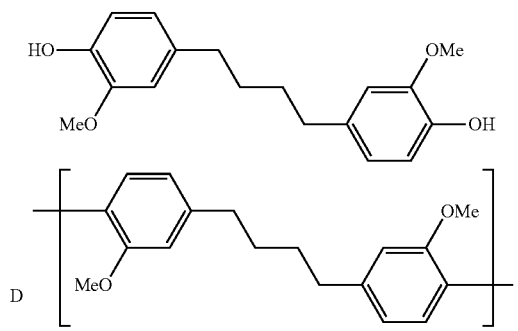

Left side is a second example of a bio-derived bisphenol; right side is structure D, which is an example of an R segment in base formula A resulting from the condensation copolymerization of the bisphenol comonomer on the left side.

An example of a perylene comonomer to be incorporated in the copolymers of the invention, for example, by a nucleophilic aromatic substitution reaction, is shown below, where $R_1$ and $R_2$ are, for example, a 2-ethylhexyl alkyl group.

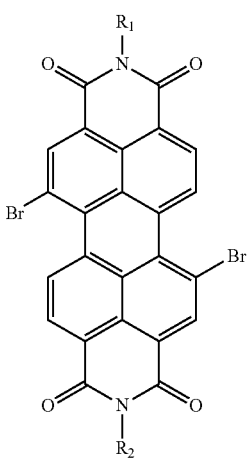

Above is an example of a dibromoperylene comonomer used to make the copolymers of embodiments of the invention. It is to be understood that the foregoing is exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

EXAMPLE 1

General experimental raw materials and analytical methods for preparing bisphenol comonomers. 2-Methoxy-4-methylphenol (Compound 1), acetaldehyde, propionaldehyde, formaldehyde (37%), $Zn(Ac)_2.2H_2O$, and concentrated HBr (48%) were purchased from Aldrich and used as received. Concentrated HCl and $H_2SO_4$ were purchased from Fisher Scientific and used as received. All NMR data were collected on a Bruker Avance II 300 MHz NMR. NMR samples of bisphenols were prepared in DMSO-$d_6$ and spectra were referenced to the solvent peak (2.50 and 39.5 ppm for $^1$H and $^{13}$C NMR, respectively). Products were further analyzed with an Agilent 6890-GC system with a Restek RTX-5MS 30-meter column. The GC inlet temperature was 250° C. and the column oven temperature program began at 40° C. for three minutes and increased to 350° C. at 10° C./min. An Agilent mass selective detector (MSD) 5973 system was used to identify the sample. All elemental analyses were carried out by Atlantic Microlabs Inc. Norcross, Ga.

EXAMPLE 2

Method for the preparation and analysis of 5,5'-(ethane-1,1-diyl)bis(2-methoxy-4-methylphenol) (Compound C). Acetaldehyde, 1.06 g (24.1 mmol), and Compound 1, 5.1 g (37.0 mmol), were diluted in 40 mL of $H_2O$. Conc. HCl (10 mL) was slowly added and then reaction was refluxed under N₂ for 4 hours. The supernatant was carefully decanted from the resulting dense oil. 3.74 g of white solid was obtained through extraction with ether and precipitation with heptane (68% yield of Compound C). Crystals suitable for an X-ray diffraction study were obtained from slow evaporation of ether at room temperature. ¹H NMR (d₆-DMSO) δ: 1.30 (d, 3H, J=7 Hz), 2.06 (s, 6H), 3.69 (s, 6H), 4.05 (t, 1H, J=7 Hz), 6.48 (s, 2H), 6.66 (s, 2H), 8.57 (s, 2H). ¹³C NMR (d₆-DMSO) δ: 18.5, 21.3, 36.1, 56.0, 114.6, 115.0, 125.7, 137.0, 144.6, 145.5. MP: 143-146° C., MS m/z: 303, 287, 269, 240, 211, 195, 164, 145, 128, 105. EA Calcd. (found): C 71.50 (71.58), H 7.33 (7.46). Further analysis of 5,5'-(ethane-1,1-diyl)bis(2-methoxy-4-methylphenol) (Compound C) is shown below.

EXAMPLE 3

Method for the preparation and analysis of 5,5'-methylenebis(2-methoxy-4-methylphenol) (Compound E). Compound 1, 5.03 g (36.4 mmol), and 37% formaldehyde, 1.47 g (18.1 mmol), were diluted in 40 mL of H₂O. 10 mL of concentrated HCl were slowly added and the reaction was refluxed under N₂ for 3 hours. A precipitate formed, the solution was decanted and the solid washed with a 10% EtOH solution. The solid was dissolved in ether and precipitated with heptane. Compound E, a white crystalline solid, was isolated in 63% yield (3.29 g). Crystals suitable for an X-ray diffraction study were obtained from slow evaporation of ether at room temperature. ¹H NMR (d₆-DMSO) δ: 2.08 (s, 6H), 3.56 (s, 2H), 3.71 (s, 6H), 6.30 (s, 2H), 6.72 (s, 2H), 8.54 (s, 2H). ¹³C NMR (d₆-DMSO) δ: 19.0, 35.0, 56.2, 115.0, 117.0, 126.3, 131.3, 144.8, 146.6. MP: 131-134° C., MS m/z: 288, 273, 257, 241, 227, 213, 195, 181, 165, 150. EA Calcd. (found): C 70.81 (70.66), H 6.99 (7.16).

EXAMPLE 4

Method for the preparation of 6,6'-methylenebis(2-methoxy-4-methylphenol) (Compound F). 5 g of 2-methoxy-4-methylphenol (Compound 1) (36.2 mmol), 1.56 g of 37% formaldehyde (19.2 mmol) and 70 mg of Zn(ac)₂·2$_{H2}$O (3.2×10⁻⁴ mol) were refluxed overnight under $_{N2}$. The resulting oil was washed with 10% EtOH, and extracted with ether. The ether was removed under reduced pressure and the resulting oil was heated to 100° C. overnight under vacuum. The resulting solid was dissolved in ether and precipitated with heptane. The light tan solid was filtered, washed with excess heptane and dried to yield 2.13 g (41%). ¹H NMR ($_{d6}$-DMSO) δ: 2.11 (s, 6H), 3.71 (s, 2H), 3.74 (s, 6H), 6.35 (d, 2H, J=2 Hz), 6.58 (d, 2H, J=2 Hz), 8.20 (s, 2H). ¹³C NMR ($_{d6}$-DMSO) δ: 21.1, 29.0, 56.2, 110.7, 122.7, 127.4, 127.7, 141.9, 147.5. MP: 123-125° C., MS: m/z: 288, 271, 255, 239, 212, 195, 165, 138, 121, 105. EA Calcd. (found): C 70.81 (70.84), H 6.99 (7.13).

EXAMPLE 5

Method for the preparation and analysis of 5,5'-(propane-1,1-diyl)bis(2-methoxy-4-methylphenol) (Compound G). Compound 1, 5.1 g (36.4 mmol), and propionaldehyde, 1.04 g (17.9 mmol), were diluted in 10 mL of $_{H2}$O. 20 mL of 48% aqueous HBr was slowly added and the reaction was stirred at room temperature overnight. The supernatant was carefully decanted from the resultant oil and the product was washed with water. Work up by the standard method described above yielded 3.82 g of viscous tan oil (67%). The product forms a solvent adduct with DMSO that crystallizes from ether solutions upon standing at room temperature. ¹H NMR ($_{d6}$-DMSO) δ: 0.85 (t, 3H, J=7 Hz), 1.73 (t, 2H, J=7 Hz), 2.10 (s, 6H), 3.69 (s, 6H), 3.81 (t, 1H, J=7 Hz), 6.52 (s, 2H), 6.65 (s, 2H), 8.55 (s, 2H). ¹³C NMR ($_{d6}$-DMSO) δ: 13.1, 18.9, 28.9, 43.3, 56.1, 114.9, 115.0, 126.3, 135.5, 144.5, 145.6. MS m/z: 316, 287, 257, 240, 211, 195, 167, 151, 131, 115. EA Calcd. (found) for 5·1.5H₂O: C 66.45 (66.33), H 7.92 (7.78). The dibromoperylene comonomers can be synthesized in two steps starting with perylene dianhydride. See for example J. Am. Chem. Soc. 2009, vol. 131, pp. 14267-14273. Scheme 1 shows a procedure for making a dibromoperylene diimide comonomer.

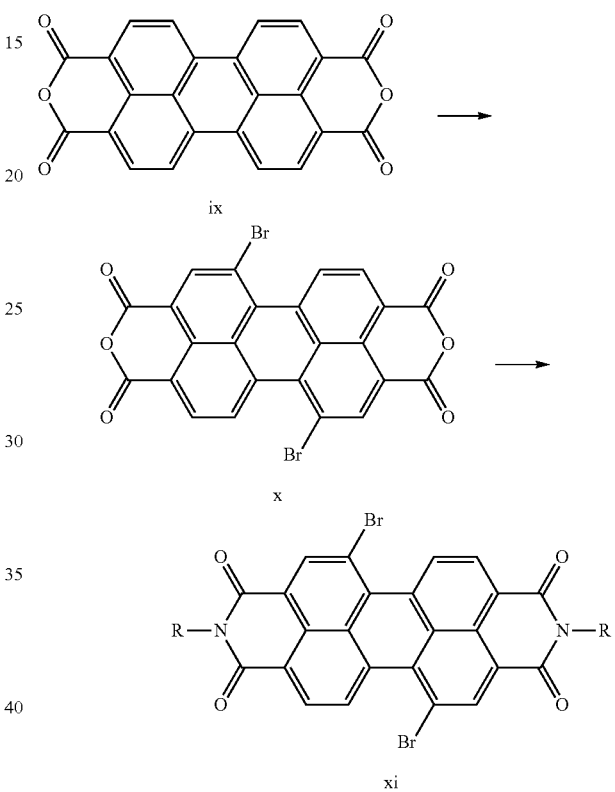

Scheme 1

Preparation of 2,7-dibromoperylene-3,4,9,10-tetracarboxylic acid dianhydride (Compound x) and diimide (Compound xi).

EXAMPLE 6

Narrative for the preparation of 2,7-dibromoperylene-3,4,9,10-tetracarboxylic acid dianhydride (Compound x) and diimide (Compound xi), Scheme 1. Compound ix (100 g, 254.9 mmol) was added to sulfuric acid (800 mL) and allowed to stir at 60° C. for 2 days. Iodine (3 g, 11.8 mol) was added and stirred for 5 hours and then bromine (200 g, 1.25 mol) was added dropwise. The heat was increased to 80° C. and the reaction was heated for another 2 days. The reaction mixture was allowed to cool to room temperature and poured into ice water (1 L). The red precipitate was collected, dried and used in the next step without further purification.

EXAMPLE 7

Narrative for the preparation of N,N'-Di(2-ethylhexyl)-1,7-dibromoperylene-3,4,9,10-tetracarboxylic acid diimide (Scheme 1, Compound xi). A flask was charged with 2,7-dibromoperylene-3,4,9,10-tetracarboxylic acid dianhydride (6.13 g, 11.1 mmol) (Compound x), 2-ethylhexylamine (4.5 mL, 30 mmol), 1-methyl-2-pyrrolidinone (50 mL) and acetic acid (3.5 mL). The suspension was heated at 100° C. for 2 days then poured into 1 M HCl (200 mL). The red precipitate was isolated by filtration then washed with water and methanol. The product was purified by column chromatography on silica gel (eluent: 70-80% dichloromethane in hexanes). The red solid was then dissolved in 50 mL of toluene. This solution was exposed to the vapor of hexanes over 14 days, resulting in the crystallization of the product as a red powder.

EXAMPLE 8

General method for the preparation of copolymers copolymers of the invention. The perylene comonomer and the bisphenol comonomer were added in a 1 to 1 stoichiometric ratio and dissolved in DMF. To this solution was added KOH as an aqueous solution and heated for 100° C. for 2 days. The solution was then heated at 120° C. for 6 hours. The solution was poured into water and the precipitate was filtered, washed with water and dried.

Novel and superior device components and devices can be made from the copolymers of embodiments of the invention, including in the fabrication of nanoplasmonic films and cavities. Some uses for the copolymers include, but are not limited to, biosensors, solar energy, optical instruments, and fiber optics. The copolymers of embodiments of the invention have several advantages over prior art, including guest-host copolymer systems in which a dye (a guest), including perylene, is dissolved or dispersed within a copolymer host material. Guest-host systems have the disadvantages of instability due to dye aggregation and toxicity due to the dye being easily removed from the surface by touch and then absorption into the body. In contrast, the perylene unit in the copolymers of embodiments of the invention is covalently attached to copolymer and thus is inhibited from aggregation and removal. Furthermore, the material of the invention has advantages of high thermal stability (to 300° Celsius) and photo-chemical stability. The material of embodiments of the invention is solution processable at ambient conditions with safe and common solvents. Importantly, the material may be processed into films having a thickness less than about 100 nm with very low roughness (less than about 1 nm), presenting a high optical quality surface upon which to deposit subsequent layers, for example, to form a stack of layers creating a nanoplasmonic coating.

EXAMPLE 9

Copolymer PB2 of the invention was used to demonstrate the fabrication of useful and novel films and devices. Copolymer PB2 is very thermally stable. By Thermal Gravimeteric Analysis (TGA) measurement PB2 has only a slight weight loss at 300° C. (probably residual solvent). Significant weight loss does not occur until the temperature reaches about 400° C. The glass transition temperature is in the range of 150° C. to 160° C. The PB2 copolymer is thermoplastic and is thus easily moldable into a variety of shapes; for example disks or rods.

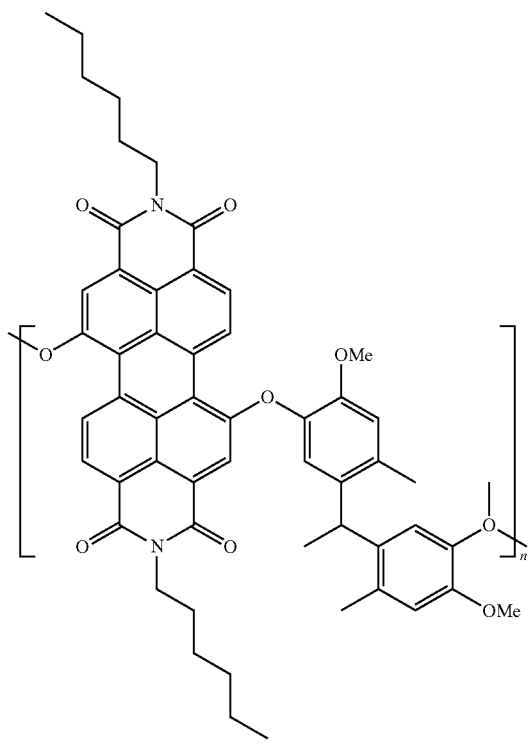

The chemical structure of PB2, an example of a soluble perylene copolymer of embodiments of the invention.

Films made of PB2 were surprisingly flat (planar) as measured by Atomic Force microscopy (AFM), as shown below. Films of PB2 can be consistently produced having peak to valley variations in the sub-nanometer range (typical peak-to-valley roughness ranging between 0.2 and 0.8 nanometers). This degree of roughness is ideal for laser media, laser mirrors, and many other applications. In this regard copolymers of embodiments of the invention have a major advantage over prior art. Thin films of these copolymers are conformal on surfaces with rather large features (e.g., >100 nm), and planarizing on surfaces having nanoscopic features (e.g., <1 nm).

EXAMPLE 10

A useful application for copolymer PB2 is in applications requiring water resistance. Copolymer PB2 has water-resistant properties similar to saccate pollen grains, which are known for their exceptionally high water resistance. After a week exposure to water in a soxhlet extractor with constant contact with hot (greater than 80° C.) water, copolymer PB2 remained a dry powder.

The following prophetic examples are for illustration purposes only and not to be used to limit any of the embodiments.

EXAMPLE 11

A leaky-mode nanoplasmonic cavity can be fabricated with the copolymers of the invention. An example of prior art on fabricating a nanoplasmonic cavity is given in Applied Physics Letters, vol. 84, no. 2231, May 2004, pp. 4421-4423. For the perylene diimide chromophore in PB2, the luminescent peak emission of PB2 occurs at 602 nm (wavelengths of peak excitation are 429 nm and 454 nm). Therefore, such a plasmonic cavity having the thickness of the top metal, copolymer PB2, and substrate layer is constructed that has a very low reflection at the excitation wavelengths of 429 nm or 454 nm. Thus, the excitation light from the perylene units can be trapped within the cavity and be fully absorbed by the copolymer. The multilayer stack is designed to be highly reflective at the both excitation and emission wavelengths. Therefore, the emitted fluorescence light can propagate inside the cavity. The copolymers of the invention are useful in other devices requiring such nanoplasmonic cavities.

EXAMPLE 12

A useful application for films of the copolymers of embodiments of the invention is in distributed feedback lasers and/or tunable Fabry-Perot lasers in which ultra-smooth surfaces are required to minimize the amount of incident light that is scattered. The ultra-smooth surface of PB2 suggests that the perylene copolymers of embodiments of the invention are amorphous and/or have a low concentration of dye aggregates. Thus the perylene copolymers of embodiments of the invention enable compact and efficient optically pumped lasers. An example of prior art on fabricating a distributed feedback laser utilizing an organic solid-stale thin film that can be excited by optical-pumping is D. Schneider, T. Rabe, T. Reidl, T. Dobbertin, M. Kroger, E. Becker, H. Johannes, W. Kowalsky, T. Weimann, J. Wang, P. Hinze, A. Gerhard, P. Stossel, H. Vestweber, "An Ultraviolet Organic Thin-Film Solid-State Laser for Biomarker Applications", Advanced Materials, vol. 17, no. 1, 6 Jan. 2005, pp. 31-34.

EXAMPLE 13

A useful application for the copolymers of embodiments of the invention is in low cost flat mirrors for laser applications that obviate the need for costly mechanical polishing. The primary property for mirrors for laser applications is the roughness. Ultra-smooth surfaces (less titan one- to five-nanometer roughness) are desired so the least amount of incident light is scattered. To make these smooth surfaces typically requires mechanical polishing, which is costly, both in terms of time and funding. A benefit as compared to mechanical processing/polishing is that the films of embodiments of the invention are produced through solution casting, which allows for scale up to large surface areas, including greater than one square foot in area.

EXAMPLE 14

A useful application for the n-type soluble copolymers of the invention is in heterojunction materials. A blend/mixture (or a block copolymer) of an n-type material and a p-type material is an electronic or photonic 'heterojunction' material, n-type organic materials generally have electron-withdrawing groups/components, such as carbonyl and sp2 nitrogen, including azo, aromatic pyridinyl and fluorocarbon. p-Type organic material generally have electron-donating groups/components, including alkoxy, amine, thiphene units. Generally, crystalline n-type and p-type copolymers are more useful in photovoltaic devices, and amorphous n-type and p-type copolymers are more useful in light emitting devices. Heterojunction copolymers are useful in devices including photovoltaic devices; organic solar cells; field-effect transistors, plastic solar cells; RFID tags; and electronic sensors.

EXAMPLE 15

A useful property of copolymer PB2, because it is readily soluble in common organic solvents including THF, chloroform and chlorobenzene, and because it forms very flat films, is that it may not require post deposition processing/treatment, including thermal curing.

Embodiments of the invention generally relate to n-type copolymers including, a soluble n-type perylene copolymer having base formula A:

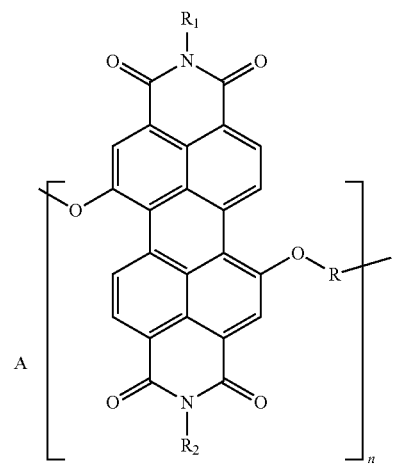

where R is a backbone segment, where $R_1$ and $R_2$ are independently selected from the group consisting of alkyl, fluorinated alkyl, functionalized alkyl, aryl, fluorinated aryl, and functionalized aryl, and where n ranges from about 2 to 50,000.

Another embodiment of the invention generally relates to film(s) having n-type copolymer including, a conformal film having soluble n-type perylene copolymer having base formula H:

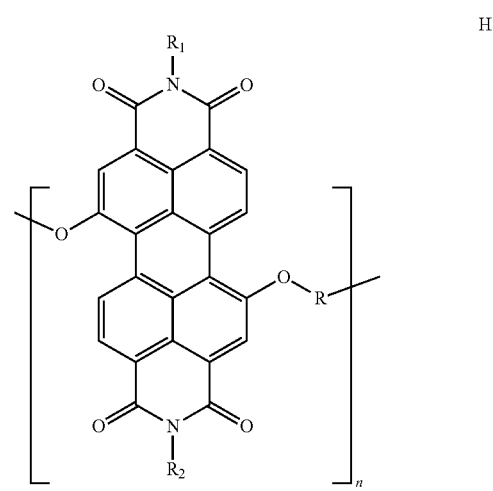

where R is a backbone segment, where $R_1$ and $R_2$ are independently selected from the group consisting of alkyl, fluorinated alkyl, functionalized alkyl, aryl, fluorinated aryl, and functionalized aryl, and where n ranges from about 2 to about 50,000.

In embodiments, $R_1$ and $R_2$ are independently selected from the group consisting of 2-ethythexyl, 4-carbon to 30-carbon alkyl, 6-carbon to 30-carbon cycloalkyl, fluorinated group(s), and perfluorinated group(s). In embodiments, R includes B:

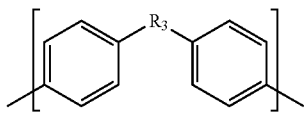
B where $R_3$ is selected from the group consisting of methylene, ethylene, propylene, isopropylene, trimethylcyclohexylene, hexafluoroisopropylene, ether, amine, carbazole, sulfide, sulfone, phosphine, phosphine oxide, and phosphinate.

In embodiments, R includes C:

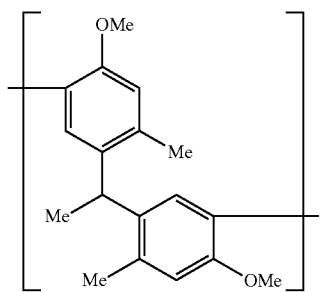
C

In embodiments, R includes D:

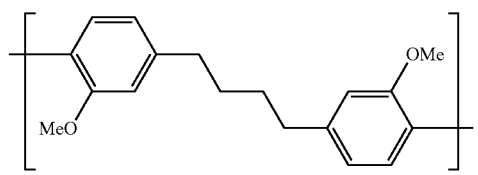
D

In embodiments, R includes E:

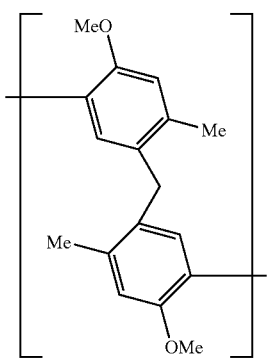
E

In embodiments, R includes F:

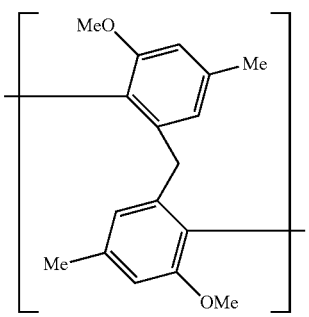
F

In embodiments, R includes G:

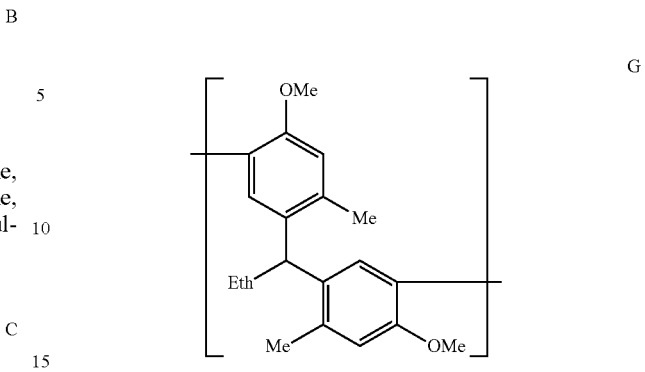
G

In embodiments, R includes biphenylene. In other embodiments, R includes triphenylene. In embodiments, the copolymer forms at least one hydrophobic coating having water resistance approximately equivalent to saccate pollen grains. In embodiments, the copolymer forms at least one conformal layer. In other embodiments, the copolymer forms at least one coplanarizing layer. In embodiments, the copolymer is combined with a p-type polymer to form a heterojunction material. In embodiments, the heterojunction material is associated in a heterojunction device. In embodiments, the copolymer forms at least one film having thickness ranging from about 5 nm to about 10,000 nm and having peak-to-valley surface roughness less than about 0.9 nanometers over a surface area of 0.5×0.5 microns as measured by atomic force microscopy. In other embodiments, the copolymer forms at least one nano-layer film having thickness ranging from about 10 nm to about 150 nm and having peak-to-valley surface roughness less than about 0.9 nanometers over a surface area of 0.5×0.5 microns as measured by atomic force microscopy.

In embodiments, the film(s) can be associate with, but not limited to, plasmonic devices, Fabry-Perot lasers, distributed feedback lasers, and mirrors. In embodiments, n can range from about 5 to about 50,000. In other embodiments, n can range from about 10 to about 50,000.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An n-type copolymer, comprising:
a soluble n-type perylene copolymer having base formula A:

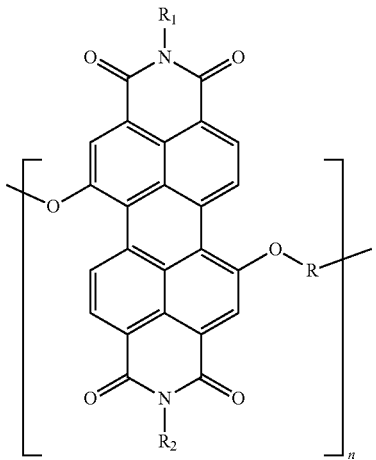

A wherein R is a backbone segment;
wherein $R_1$ and $R_2$ are independently selected from the group consisting of alkyl, fluorinated alkyl, functionalized alkyl, aryl, fluorinated aryl, and functionalized aryl; and
wherein n ranges from about 2 to 50,000.

2. The copolymer according to claim 1, wherein $R_1$ and $R_2$ are independently selected from the group consisting of 2-ethylhexyl, 4-carbon to 30-carbon alkyl, 6-carbon to 30-carbon cycloalkyl, fluorinated group(s), and perfluorinated group(s).

3. The copolymer according to claim 1, wherein said R includes B:

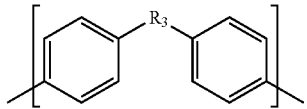

B wherein $R_3$ is selected from the group consisting of methylene, ethylene, propylene, isopropylene, trimethylcyclohexylene, hexafluoroisopropylene, ether, amine, carbazole, sulfide, sulfone, phosphine, phosphine oxide, and phosphinate.

4. The copolymer according to claim 1, wherein said R includes C:

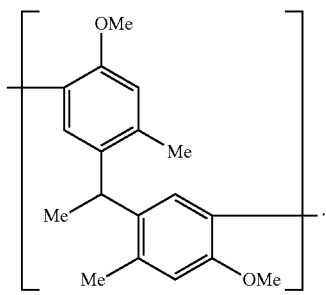

C

5. The copolymer according to claim 1, wherein said R includes D:

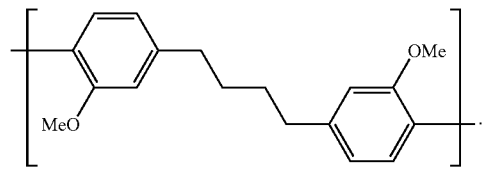

D

6. The copolymer according to claim 1, wherein said R includes E:

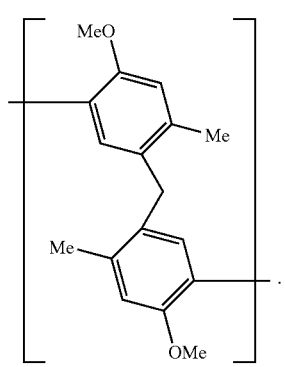

E

7. The copolymer according to claim 1, wherein said R includes F:

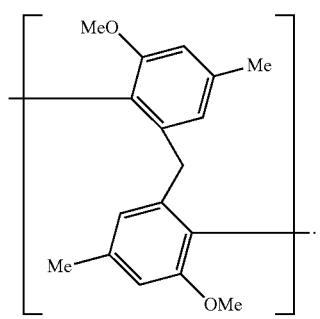

F

8. The copolymer according to claim 1, wherein said R includes G:

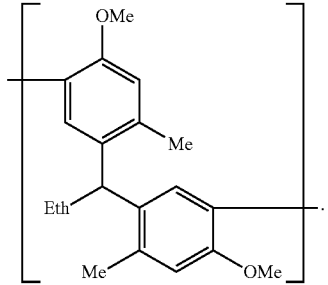

G

9. The copolymer according to claim 1, wherein said R includes biphenylene.

10. The copolymer according to claim 1, wherein said R includes triphenylene.

11. The copolymer according to claim 1, wherein said copolymer forms at least one hydrophobic coating having water resistance approximately equivalent to saccate pollen grains.

12. The copolymer according to claim 1, wherein said copolymer forms at least one conformal layer.

13. The copolymer according to claim 1, wherein said copolymer forms at least one coplanarizing layer.

14. The copolymer according to claim 1, wherein said copolymer is combined with a p-type polymer to form a heterojunction material.

15. The copolymer according to claim 14, wherein said heterojunction material is associated in a heterojunction device.

16. The copolymer according to claim 1, wherein said copolymer forms at least one film having thickness ranging from about 5 nm to about 10,000 nm and having peak-to-valley surface roughness less than about 0.9 nanometers over a surface area of 0.5×0.5 microns as measured by atomic force microscopy.

17. The copolymer according to claim 16, wherein said film(s) is associated in plasmonic devices.

18. The copolymer according to claim 16, wherein said film(s) is associated in Fabry-Perot lasers.

19. The copolymer according to claim 16, wherein said film(s) is associated in distributed feedback lasers.

20. The copolymer according to claim 16, wherein said film(s) is associated in mirrors.

21. The copolymer according to claim 1, wherein said copolymer forms at least one nano-layer film having thickness ranging from about 10 nm to about 150 nm and having peak-to-valley surface roughness less than about 0.9 nanometers over a surface area of 0.5×0.5 microns as measured by atomic force microscopy.

22. The copolymer according to claim 1, wherein n ranges from about 5 to about 50,000.

23. The copolymer according to claim 1, wherein n ranges from about 10 to about 50,000.

24. A film(s) having n-type copolymer, comprising:
a conformal film having soluble n-type perylene copolymer having base formula H:

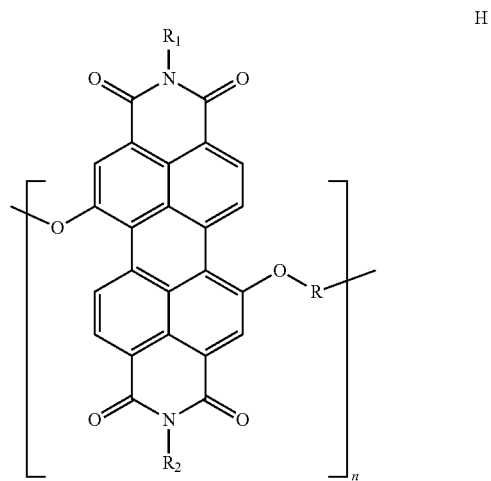

wherein R is a backbone segment;
wherein $R_1$ and $R_2$ are independently selected from the group consisting of alkyl, fluorinated alkyl, functionalized alkyl, aryl, fluorinated aryl, and functionalized aryl; and
wherein n ranges from about 2 to about 50,000.

* * * * *